(12) United States Patent
Cayley, Sr. et al.

(10) Patent No.: US 9,144,870 B2
(45) Date of Patent: Sep. 29, 2015

(54) ROTARY PALLET POOL

(71) Applicants: Michael Paul Cayley, Sr., South Barrington, IL (US); Timothy J. Hilger, Lagrange Park, IL (US)

(72) Inventors: Michael Paul Cayley, Sr., South Barrington, IL (US); Timothy J. Hilger, Lagrange Park, IL (US)

(73) Assignee: Midaco Corporation, Elk Grove Village, IL (US)

( * ) Notice: Subject to any disclaimer, the term of this patent is extended or adjusted under 35 U.S.C. 154(b) by 0 days.

(21) Appl. No.: 14/021,832

(22) Filed: Sep. 9, 2013

(65) Prior Publication Data

US 2014/0151186 A1    Jun. 5, 2014

Related U.S. Application Data

(60) Provisional application No. 61/698,372, filed on Sep. 7, 2012.

(51) Int. Cl.
| | |
|---|---|
| *B65G 37/00* | (2006.01) |
| *B65H 1/00* | (2006.01) |
| *B23Q 15/00* | (2006.01) |
| *B23Q 7/14* | (2006.01) |

(52) U.S. Cl.
CPC .................................. *B23Q 7/1431* (2013.01)

(58) Field of Classification Search
CPC .................................................. B23Q 15/013
USPC ............... 198/346.1, 346.2, 617; 414/222.07, 414/222.13, 223.01; 29/33 P, 563
See application file for complete search history.

(56) References Cited

U.S. PATENT DOCUMENTS

| | | | | |
|---|---|---|---|---|
| 4,185,376 A | * | 1/1980 | Johnstone | 483/10 |
| 4,480,738 A | * | 11/1984 | Mattson | 198/346.1 |
| 4,637,108 A | * | 1/1987 | Murata et al. | 29/33 P |
| 4,736,512 A | * | 4/1988 | Gusching et al. | 483/14 |
| 4,802,569 A | * | 2/1989 | Aidlin et al. | 198/346.1 |
| 4,934,031 A | * | 6/1990 | Maeda et al. | 29/33 P |
| 4,996,754 A | * | 3/1991 | Kitamura | 29/33 P |
| 5,044,486 A | * | 9/1991 | Kitamura | 198/346.1 |
| 5,052,540 A | * | 10/1991 | Matsuyama et al. | 198/346.1 |
| 5,222,285 A | * | 6/1993 | Horikawa | 29/33 P |
| 5,314,397 A | * | 5/1994 | Mills et al. | 483/30 |
| 5,370,212 A | * | 12/1994 | Mizutani et al. | 198/346.1 |
| 5,622,247 A | * | 4/1997 | Yamada | 198/346.1 |
| 5,992,608 A | * | 11/1999 | Ahn | 198/346.1 |
| 5,997,241 A | * | 12/1999 | Malcolm | 414/806 |
| 6,193,048 B1 | * | 2/2001 | Keith | 198/346.1 |
| 6,308,815 B1 | * | 10/2001 | Keith | 198/346.1 |
| 6,679,369 B2 | * | 1/2004 | Okuyama | 198/346.1 |
| 6,688,452 B2 | * | 2/2004 | Watanabe et al. | 198/346.1 |
| 6,851,542 B2 | * | 2/2005 | Bernhard et al. | 198/346.1 |
| 7,621,031 B2 | * | 11/2009 | Kawai et al. | 29/33 P |
| 7,721,398 B2 | * | 5/2010 | Bernhard et al. | 29/33 P |
| 7,975,998 B2 | * | 7/2011 | Keith et al. | 269/309 |

* cited by examiner

*Primary Examiner* — Douglas Hess
(74) *Attorney, Agent, or Firm* — Pauley Erickson & Kottis

(57) ABSTRACT

A rotary pallet device for delivering a pallet to an automated machine, such as a CNC vertical machining center. A pallet is mounted to a retractable slide. The retractable slide is movably mounted with respect to a rotatable platform. An operator or worker accesses one or more stations, each with a rotatable door that at least partially houses a receiver for a pallet and/or a workpiece.

21 Claims, 7 Drawing Sheets

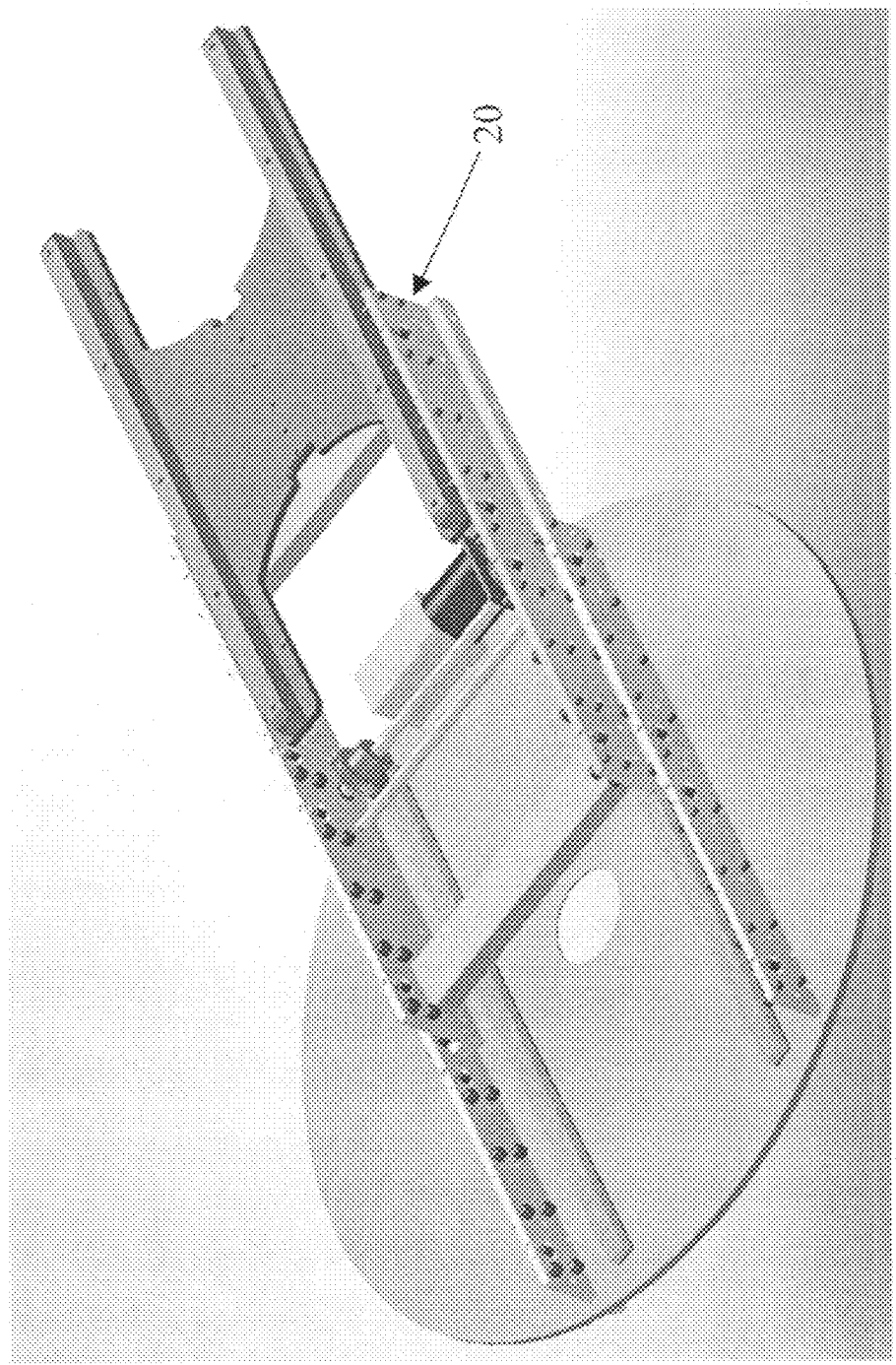

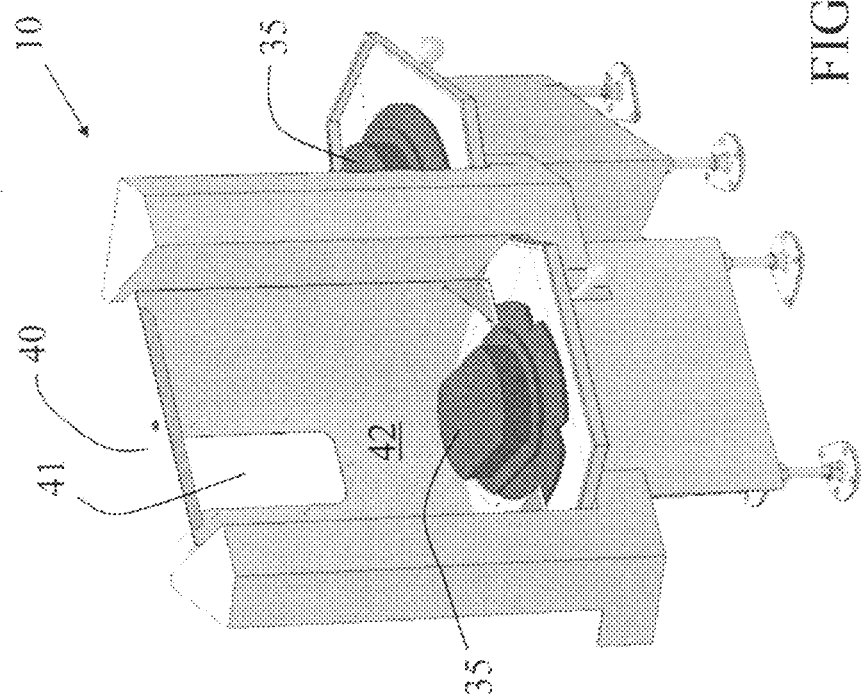

ROTARY PALLET POOL

CROSS REFERENCE TO RELATED APPLICATION

This application claims the priority benefit of Provisional U.S. Patent Application, Ser. No. 61/698,372, filed on 7 Sep. 2012. This Provisional U.S. Patent Application Ser. No. 61/698,372, in its entirety, is incorporated by reference into this specification and is made a part hereof, including but not limited to those portions which specifically appear hereinafter.

BACKGROUND OF THE INVENTION

1. Field of the Invention

This invention relates to an advanced rotary pallet pool that can, for example, provide synchronized delivery of multiple pallets to various types of automated machines, such as a CNC Vertical Machining Center.

2. Discussion of Related Art

Conventional automated machines use pallets to secure and/or otherwise mount workpieces. The known automated machines modify the workpieces over a given time period, often without requiring an operator's attention.

Conventional automated machines are able to handle multiple pallets. Known safety doors slide or otherwise move in an upward and/or a downward direction.

SUMMARY OF THE INVENTION

In some embodiments of this invention, a rotatable platform uses a servo controlled rotary carriage, which can rotate, extend and/or contract to precise locations, including but not limited to locations at or near an automated machine. According to this invention, the rotatable platform and/or rotary carriage can have any suitable load carrying capacity, including but not limited to a load carrying capacity of about 2,000 pounds and/or can have an ability to extend and/or contract to any suitable length, for example, 60 inches in length. In some embodiments of this invention, the rotary carriage can have any suitable rotational accuracy, for example, about 1/10 of one degree and/or any suitable translational accuracy, for example, a translational accuracy of about 0.005 inches. The table design of the pallet pool according to this invention allows a particular number of loading stations, for example, a total of five (5) loading stations. In some embodiments of this invention, one or more of the loading stations can be independent and/or self-contained and/or can be added to and/or removed from the number of five (5), depending on specifications, such as a customer's requirements.

The pallet pool of this invention can also include a system of safety switches and/or sensors which can be used for verifying a particular location, for location verification and/or for operational safety. In some embodiments of this invention, the design of the rotary pallet pool allows an operator to safely load multiple pallets, even when the corresponding automated machine is operating, which can save significant amounts of downtime of the machine and/or of the labor necessary to operate the machine.

It is possible to reduce downtime by loading multiple pallets. According to certain embodiments of this invention, it is possible to load multiple pallets and thereby reduce downtime or the time during which the machine is not operating. Without this ability, an operator, who typically uses one pallet at a time would be required to shut down the corresponding operating automated machine, such as while the pallet is loaded and unloaded from the automated machine.

The rotary pallet pool according to this invention can be used to reduce floor space. In some embodiments according to this invention, the loading stations are arranged or otherwise positioned in a specified pattern, such as a circular pattern, which can be used to reduce a travel time and can also provide increased accessibility.

With an interlocking safety system, in some embodiments according to this invention, the system of switches and/or sensors and/or the arrangement of barrier walls can be used to provide a safety barrier, for example, so that the operator or worker can safely use the inactive, open and/or unused loading stations, even while the corresponding machine is operating or working.

According to certain embodiments of this invention, the carriage design is not only accurate but also can have any suitable relatively large loading capacity, for example a 2000 pound loading capacity, while at the same time or simultaneously conserving floor space at or near the automated machines.

In some embodiments according to this invention, the system of switches and/or sensors allows the operator to perform other tasks without a need for the operator to watch the corresponding operating machine. In some embodiments of this invention, when the machining is complete, the pallets are automatically reloaded, and if a fault occurs or if something goes wrong, the pallets system will shut itself down.

In some embodiments of this invention, the software used on the rotary pallet pool allows the operator to customize or tailor the rotary movement to any suitable specifications. According to some embodiments of this invention, the rotary pallet pool allows for the addition or subtraction of loading stations, for example, depending on the requirements of the customer, which can be used to optimize floor space and/or increase operational efficiency.

BRIEF DESCRIPTION OF THE DRAWINGS

FIG. 6 is a perspective view of a carriage assembly for a rotary pallet pool assembly, according to one embodiment of this invention; and FIG. 7 is a perspective view of a portable loading station for a rotary pallet pool assembly, according to one embodiment of this invention.

DETAILED DESCRIPTION OF THE PREFERRED EMBODIMENTS

Figure 2:
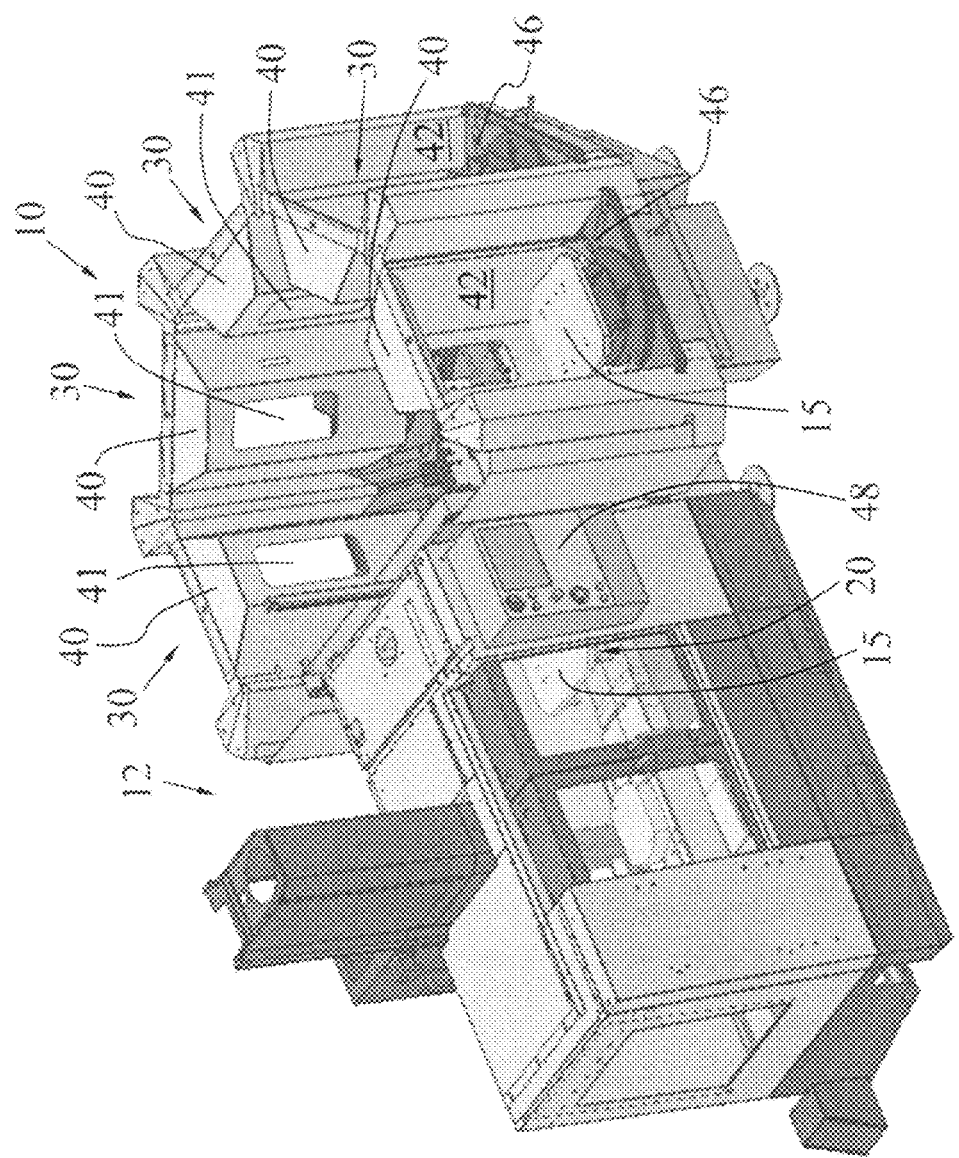
FIG. 2 is a perspective view of a rotary pallet pool assembly, with five stations, according to one embodiment of this invention.

FIG. 2 shows rotary pallet device 10, according to one embodiment of this invention, such as for delivering pallet 15 to automated machine 12. In some embodiments of this invention, automated machine 12 can be any suitable automated machine, including but not limited to a CNC machining center, such as a CNC vertical machining center. Automated machine 12 can be any other suitable machinery that accomplishes automated work.

Figure 1:
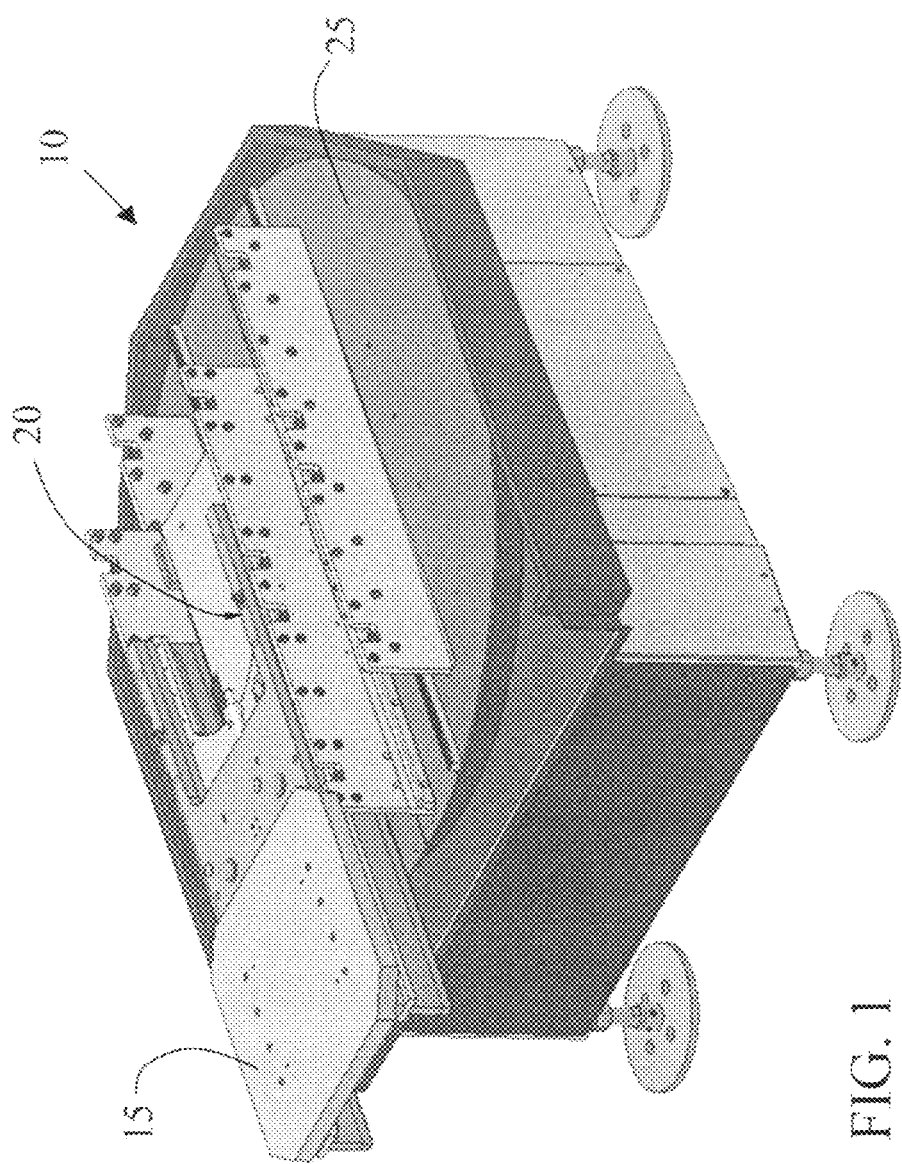
FIG. 1 is a perspective view of a rotary pallet pool assembly, without stations, according to one embodiment of this invention.

FIG. 1 shows one embodiment of rotary pallet device 10, according to this invention. FIG. 2 shows a combination of rotary pallet device 10 working in communication with automated machine 12, according to one embodiment of this invention. As shown in FIG. 1, rotary pallet device 10 comprises pallet 15 mounted to retractable slide 20. Pallet 15 can be connected, attached, mounted and/or otherwise positioned with respect to retractable slide 20 with bolts, nuts, springs, brackets and/or by any other suitable connector known to those skilled in the art.

In some embodiments according to this invention, a workpiece, including but not limited to a fixture and/or a raw material, can be removably attached and/or otherwise fixed in position with respect to pallet 15. Any other suitable material can be substituted for and/or used in combination with the workpiece.

Figure 3:
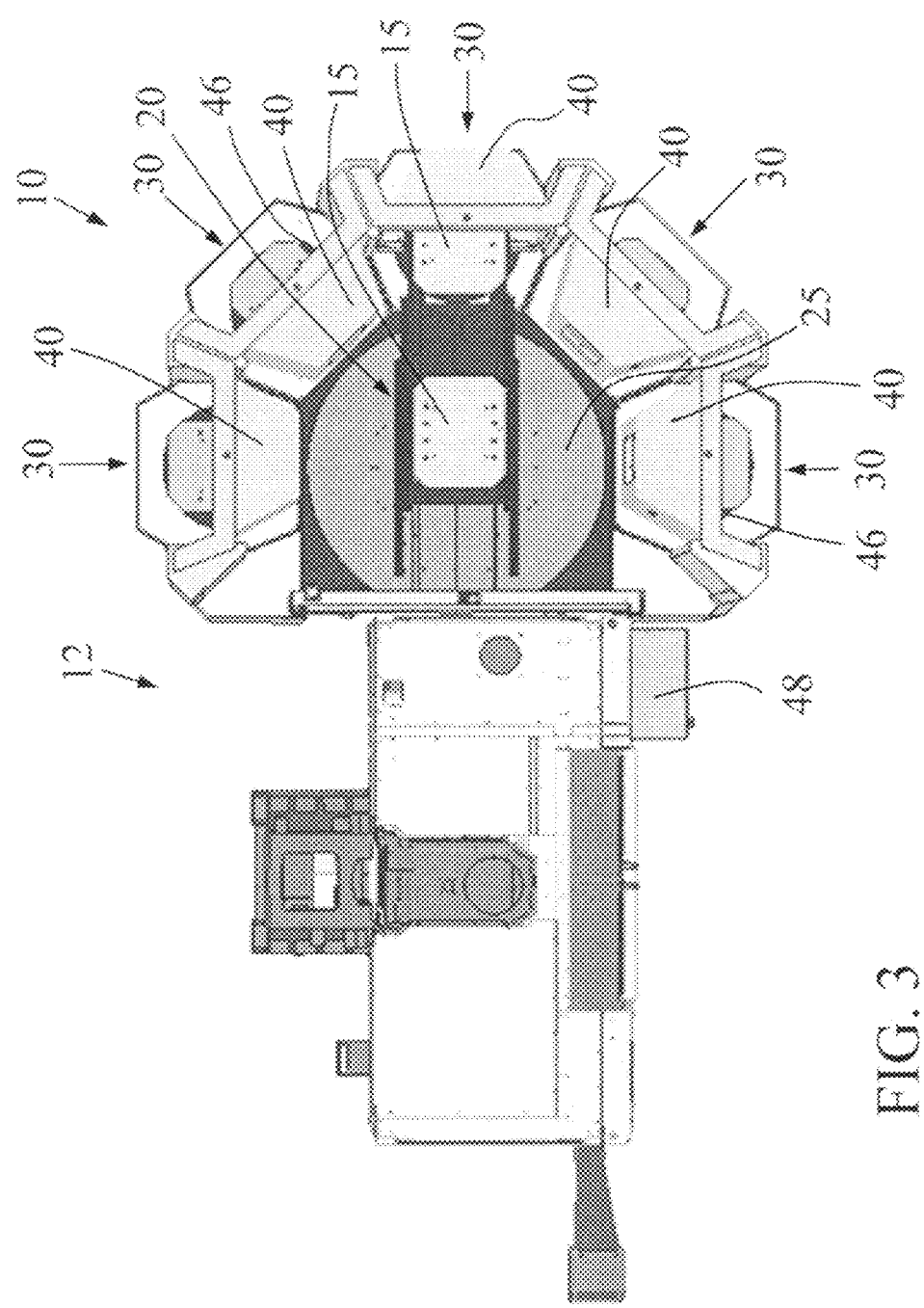
FIG. 3 is a top view of the rotary pallet pool assembly, according to one embodiment of this invention.

According to some embodiments of this invention, such as shown in FIGS. 1-7, rotatable platform 25 is rotatably mounted and can be locked and/or moved into any suitable fixed position, for example, which results in the movement of pallet 15. According to some embodiments of this invention, retractable slide 20 is movably mounted with respect to rotatable platform 25. In some embodiments of this invention, rotary pallet device 10 comprises one or more independent stations 30. Each station 30 can comprise receiver 35 for accepting and locking pallet 15. In some embodiments according to this invention, each station 30 has rotatable door 40 at least partially housing receiver 35, for example as shown in FIGS. 2 and 3. In some embodiments of this invention, rotatable door 40 forms load space 42, for example, for allowing an operator or worker to access receiver 35.

Regardless of the number of stations 30, in some embodiments of this invention, each station 30 is independent. An operator or worker can access and/or load pallet 15 and/or receiver 35, and thus fix, mount and/or otherwise attach a workpiece to one or more pallets 15.

In some embodiments of this invention, retractable slide 20 is also extendible. In other embodiments of this invention, retractable slide 20 can have any other suitable configuration that allows a mounted pallet 15 to slide and/or otherwise move in a similar manner with respect to rotatable platform 25 and/or station 30. In some embodiments according to this invention, each station 30 is independently accessible by an operator or worker.

In some embodiments of this invention, pallet 15 is removably mounted or otherwise suitably fixed and/or attached directly to or with respect to retractable slide 20. In some embodiments of this invention, pallet 15 is releasably locked with respect to receiver 35.

In some embodiments according to this invention, rotatable door 40 is movable between a load position, such as shown in FIG. 3 by the top two and the bottom two stations 30, and an access position, such as shown in FIG. 3 by the single middle and only remaining station 30. With rotary pallet device 10 in the load position, rotatable door 40 provides a safety barrier to an operator or worker, for example, accessing or working at receiver 35 at station 30. With rotary pallet device 10 in the access position, retractable slide 20 can access a loaded pallet 15, which for example can be mounted with respect to receiver 35 at station 30.

Figure 4:
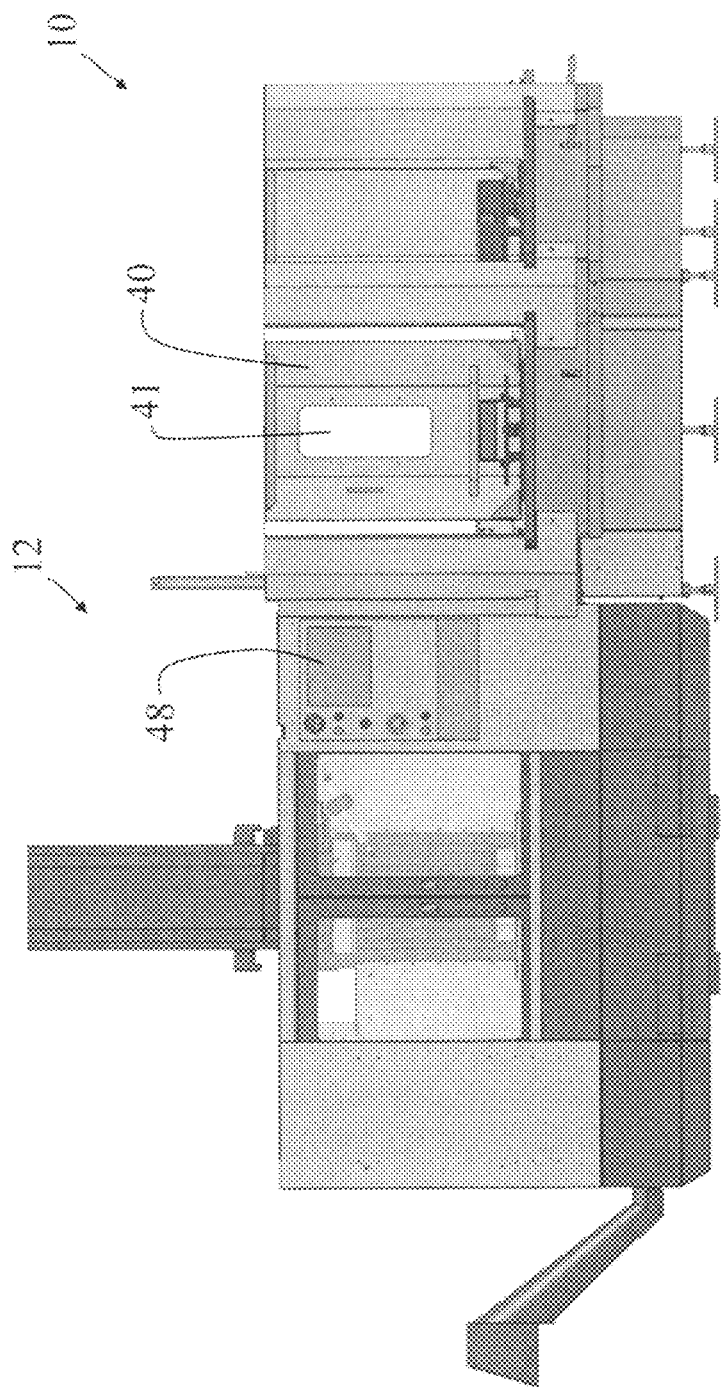
FIG. 4 is a front view of the rotary pallet pool assembly, as shown in FIG. 2.
Figure 5:
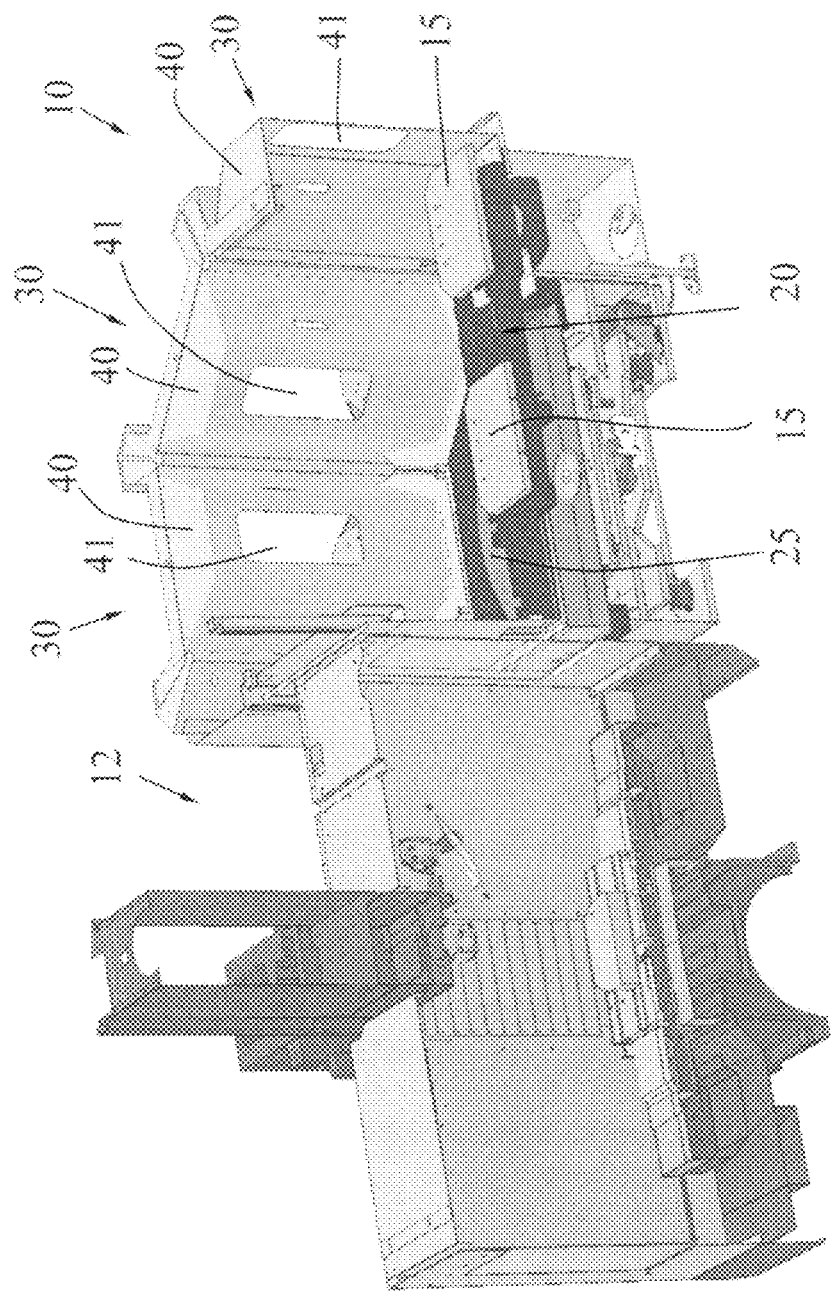
FIG. 5 is a perspective sectional view of a rotary pallet pool assembly, according to another embodiment of this invention.

In some embodiments of this invention, sensor 46 is used to detect the access position, such as of rotatable door 40, and based on a given software protocol can emit a position signal, for example, to controller 48, such as shown in FIG. 4. In some embodiments of this invention, controller 48 then calculates and/or processes the position signal and emits an access signal, for example, to move and/or otherwise operate retractable slide 20, such as to and/or near one or more stations 30.

In some embodiments of this invention, rotary pallet device 10 comprises two or more stations 30 and, for example, retractable slide 20 accesses one station 30 at a given time. In other embodiments of this invention, retractable slide 20 can access more than one station 30 at a given time.

In some embodiments of this invention, receiver 35 is releasably locked to pallet 15, such as with a spring-loaded latching device. In other embodiments of this invention, rotatable door 40 has window panel 41, through which an operator or worker can visualize or otherwise see beyond rotatable door 40. In some embodiments of this invention, each station 30 is independent and allows a workpiece to be loaded on any one or more pallets 15. In some embodiments of this invention, the workpiece is releasably locked with respect to receiver 35.

In some embodiments of this invention, automated machine 12 has a second receiver 35 which can be releasably locked directly to or with respect to pallet 15.

In some embodiments of this invention, a method for delivering pallet 15 to automated machine 12 includes moving pallet 15 with retractable slide 20, and rotatably positioning rotatable platform 25. Retractable slide 20 can be moved and/or otherwise repositioned with respect to rotatable platform 25, for example, to accept pallet 15 at a specific station 30. In some embodiments of this invention, pallet 15 releasably locks pallet 15 to receiver 35 at particular station 30. In some embodiments of this invention, rotatable door 40 is moved and at least partially houses receiver 35 at station 30.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. A rotary pallet device for delivering a pallet to an automated machine, the rotary pallet device comprising:
a pallet mounted to a retractable slide, a rotatable platform, the retractable slide movably mounted with respect to the rotatable platform, at least one station, each station having a receiver for accepting and locking the pallet, each said station having a rotatable door at least partially housing the receiver, and the rotatable door forming a load space for accessing the receiver,
wherein the retractable slide and the rotatable platform cooperate to horizontally move the pallet from the at least one station to the automated machine.

2. The rotary pallet device according to claim 1 wherein the retractable slide is extendible.

3. The rotary pallet device according to claim 1 wherein the station is accessible by an operator.

4. The rotary pallet device according to claim 1 wherein the pallet is removably mounted to the retractable slide.

5. The rotary pallet device according to claim 1 wherein the pallet is releasably locked with respect to the receiver.

6. The rotary pallet device according to claim 1 wherein the rotatable door is movable between a load position and an access position.

7. The rotary pallet device according to claim 6 wherein in the load position the rotatable door provides a safety barrier to an operator accessing the receiver at the station.

8. The rotary pallet device according to claim 6 wherein in the access position the retractable slide accesses a loaded pallet mounted with respect to the receiver at the station.

9. The rotary pallet device according to claim 6 wherein a sensor detects the access position and emits a position signal to a controller, and the controller processes the position signal and emits an access signal to move the retractable slide to the station.

10. The rotary pallet device according to claim 1 wherein the rotary pallet device has two or more stations and the retractable slide accesses one said station at a time.

11. The rotary pallet device according to claim 1 wherein the receiver is releasably locked to the pallet.

12. The rotary pallet device according to claim 1 wherein the rotatable door has a window panel.

13. The rotary pallet device according to claim 1 wherein each said station is independent and allows a workpiece to be loaded on the pallet which is releasably locked with respect to the receiver.

14. The rotary pallet device according to claim 1 wherein the automated machine has a second receiver releasably locked to the pallet.

15. A method for delivering a pallet to an automated machine, including the steps of:
moving the pallet with a retractable slide, rotatably positioning a rotatable platform, moving the retractable slide with respect to the rotatable platform, accepting the pallet at a station, releasably locking the pallet to a receiver at the station, and moving a rotatable door that at least partially houses the receiver at the station.

16. The method according to claim 15 wherein the rotatable door is moved between a load position and an access position.

17. The method according to claim 16 wherein in the access position the retractable slide accesses a loaded pallet mounted with respect to the receiver at the station.

18. The method according to claim 15 wherein the station is independent with respect to a second station and at each of the station and the second station a workpiece is loaded on the pallet which is releasably locked with respect to the receiver.

19. The method according to claim 15 wherein the receiver is releasably locked to the pallet.

20. The method according to claim 15 wherein in a load position the rotatable door provides a safety barrier to an operator accessing the receiver at the station.

21. A rotary pallet device for delivering a pallet to an automated machine, the rotary pallet device comprising:
a retractable slide to which a pallet is mountable, a rotatable platform, the retractable slide movably mounted with respect to the rotatable platform, at least two or more stations, each station having a receiver for accepting and locking the pallet, each said station having a rotatable door at least partially housing the receiver, and the rotatable door forming a load space for accessing the receiver.

* * * * *